US011829796B2

(12) United States Patent
Brandwine

(10) Patent No.: US 11,829,796 B2
(45) Date of Patent: *Nov. 28, 2023

(54) AUTOMATED ROLLBACK

(71) Applicant: Amazon Technologies, Inc., Reno, NV (US)

(72) Inventor: Eric Jason Brandwine, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 390 days.

This patent is subject to a terminal disclaimer.

(21) Appl. No.: 16/951,697

(22) Filed: Nov. 18, 2020

(65) Prior Publication Data

US 2021/0073031 A1 Mar. 11, 2021

Related U.S. Application Data

(63) Continuation of application No. 16/395,067, filed on Apr. 25, 2019, now Pat. No. 10,846,135, which is a (Continued)

(51) Int. Cl.
*G06F 9/50* (2006.01)
*G06F 8/65* (2018.01)
(Continued)

(52) U.S. Cl.
CPC .............. *G06F 9/50* (2013.01); *G06F 8/65* (2013.01); *G06F 8/71* (2013.01); *G06F 9/5005* (2013.01);
(Continued)

(58) Field of Classification Search
CPC . G06F 9/50; G06F 9/5005; G06F 8/65; G06F 8/71; H04L 67/02; H04L 67/306; H04L 67/1097
See application file for complete search history.

(56) References Cited

U.S. PATENT DOCUMENTS 7,440,973 B2 10/2008 Tsukeman
8,881,129 B1 11/2014 McKinnon et al.
(Continued)

OTHER PUBLICATIONS

Non-Final Office Action issued in co-related U.S. Appl. No. 14/938,428 dated Feb. 23, 2017.
(Continued)

*Primary Examiner* — Jacob D Dascomb
(74) *Attorney, Agent, or Firm* — Hogan Lovells US LLP

(57) ABSTRACT

A customer having a deployment in a resource provider environment can request one or more changes to the deployment using one or more application programming interface (API) requests. Along with the one or more changes, the customer can specify one or more metrics or behaviors, or a function thereof, for the deployment to be monitored for at least a period of time after the change is implemented. The customer can also specify acceptable or unacceptable values or ranges for the metrics. If the value of a specified metric is determined during the monitoring to have an unacceptable value, the change can be automatically rolled back or undone. The roll back in some embodiments takes the form of a change in state to yet another state that will cause the deployment to operate similar to a state before the change was implemented.

20 Claims, 5 Drawing Sheets

Related U.S. Application Data continuation of application No. 14/938,428, filed on Nov. 11, 2015, now Pat. No. 10,275,282.

(51) Int. Cl.
| | | |
|---|---|---|
| *H04L 67/02* | (2022.01) | |
| *H04L 67/306* | (2022.01) | |
| *G06F 8/71* | (2018.01) | |
| *H04L 67/1097* | (2022.01) | |

(52) U.S. Cl.
CPC ............ *H04L 67/02* (2013.01); *H04L 67/306* (2013.01); *H04L 67/1097* (2013.01)

(56) References Cited

U.S. PATENT DOCUMENTS

| | | | | |
|---|---|---|---|---|
| 2006/0130042 A1* | 6/2006 | Dias | ......................... | G06F 8/656 717/168 |
| 2010/0273450 A1 | 10/2010 | Papineau et al. | | |
| 2014/0026144 A1 | 1/2014 | Pack | | |
| 2014/0047115 A1* | 2/2014 | Lipscomb | ............. | G06F 9/5022 709/226 |
| 2014/0079207 A1* | 3/2014 | Zhakov | ............... | H04M 3/5233 379/265.03 |
| 2014/0258999 A1 | 9/2014 | Katihar et al. | | |
| 2015/0180736 A1 | 6/2015 | Leung | | |
| 2019/0250943 A1 | 8/2019 | Charters | | |

OTHER PUBLICATIONS

Final Office Action issued in co-related U.S. Appl. No. 14/938,428 dated Jun. 16, 2017.
Non-Final Office Action issued in co-related U.S. Appl. No. 14/938,428 dated Mar. 13, 2018.
Final Office Action issued in co-related U.S. Appl. No. 14/938,428 dated Aug. 30, 2018.
Notice of Allowance issued in co-related U.S. Appl. No. 14/938,428 dated Dec. 17, 2018.
Non-Final Office Action issued in co-related U.S. Appl. No. 16/395,067 dated Sep. 13, 2019.
Final Office Action issued in co-related U.S. Appl. No. 16/395,067 dated Dec. 19, 2019.
Non-Final Office Action issued in co-related U.S. Appl. No. 16/395,067 dated Apr. 1, 2020.
Notice of Allowance issued in co-related U.S. Appl. No. 16/395,067 dated Jul. 28, 2020.

* cited by examiner

AUTOMATED ROLLBACK

CROSS-REFERENCE TO RELATED APPLICATIONS

This application is a continuation of U.S. application Ser. No. 16/395,067, entitled "AUTOMATED ROLLBACK," filed Apr. 25, 2019; which application is a continuation of U.S. application Ser. No. 14/938,428, now U.S. Pat. No. 10,275,282, entitled "AUTOMATED ROLLBACK," filed Nov. 11, 2015; which are all incorporated herein by reference for all purposes.

BACKGROUND

Users are increasingly causing computing operations to be performed in resource environments offered by one or more resource providers, those environments often referred to as part of "the cloud." As an example, a customer of such an environment might have several resources dedicated to performing certain tasks, as may be part of an enterprise offering. Over time, the customer may want to make changes to the ways in which those tasks are performed, or to provide new or alternative tasks. The customer may also want to make other changes, such as to the types or numbers of resources used in performing the tasks. Any such change comes with the risk that the change will have an undesired impact on the performing, as may relate to the accuracy, latency, or availability of the task performance, among other potential issues. Oftentimes the customer must monitor the performance over time and attempt to determine whether any negative impact has occurred, and determine the extent of that impact. If necessary, the customer must then attempt to undo or modify the change in order to return the performance to a desired level, for example, which can be difficult in many situations, and can also result in undesirable unavailability or other issues while the customer attempts to determine and correct the problem.

BRIEF DESCRIPTION OF THE DRAWINGS

Various embodiments in accordance with the present disclosure will be described with reference to the drawings, in which.

DETAILED DESCRIPTION

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Approaches in accordance with various embodiments provide for the automated managing of state in an electronic environment. In particular, various embodiments provide for the monitoring or one or more metrics or behaviors for a deployment in response to a change to the deployment, such that the change can be automatically undone if one of the metrics is determined to have an unacceptable value or fall outside an acceptable value range, or if an unacceptable behavior is detected.

In some embodiments, a customer having a deployment in a resource provider environment can request one or more changes to the deployment using one or more application programming interface (API) requests. Along with the one or more changes, the customer can specify one or more metrics, or a function of metrics, to be monitored for the deployment for at least a period of time after the change is implemented. The customer can also specify acceptable or unacceptable values or ranges for the metrics. If the value of a specified metric is determined during the monitoring to have an unacceptable value, the change can be automatically rolled back or undone. The roll back in some embodiments can take the form of a change in state to yet another state that will cause the deployment to operate similar to a state before the change was implemented.

Various other functions can be implemented within the various embodiments as well as discussed and suggested elsewhere herein.

Figure 1:
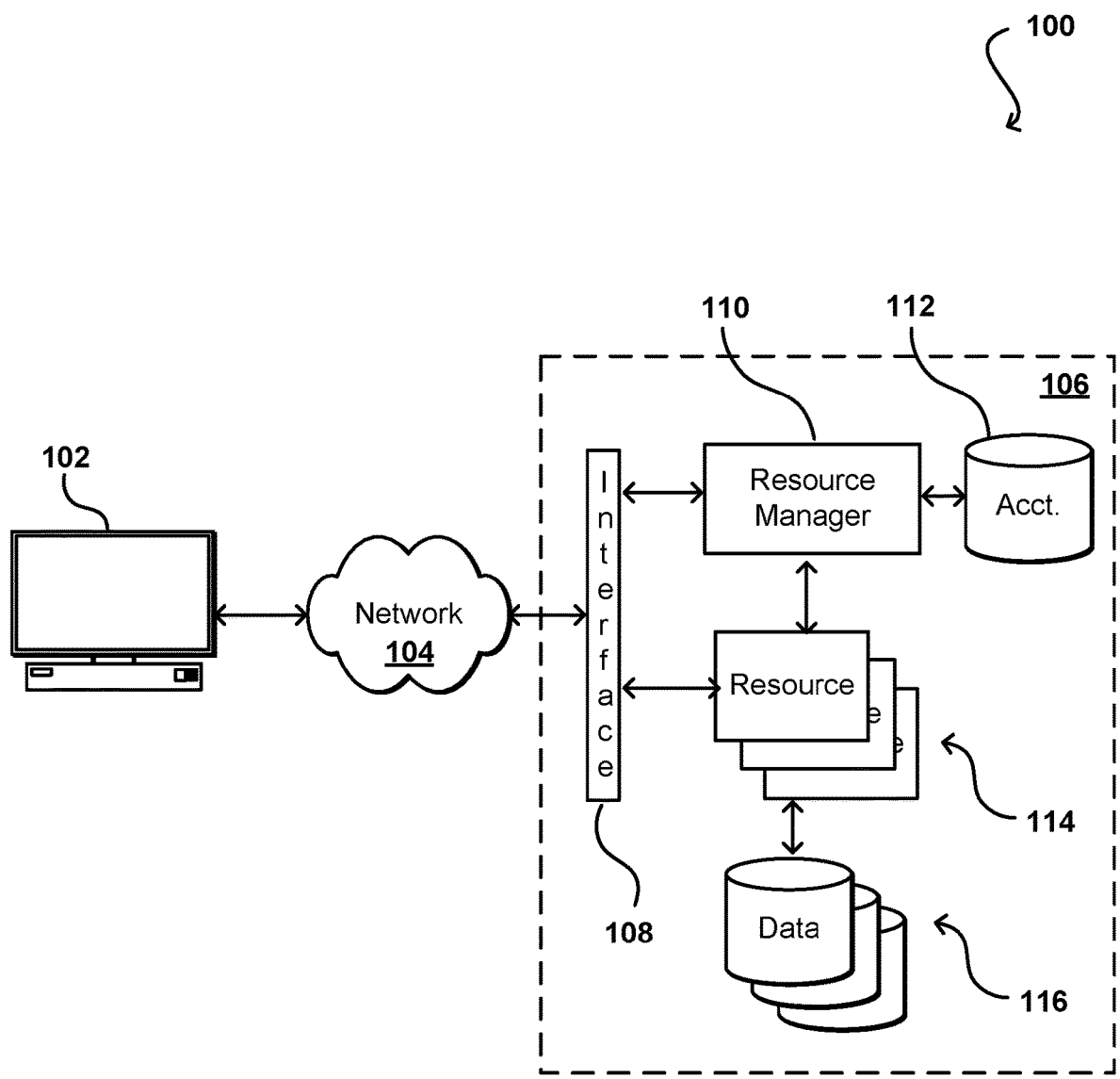
FIG. 1 illustrates an example environment in which various embodiments can be implemented.

FIG. 1 illustrates an example environment 100 in which aspects of the various embodiments can be implemented. In this example a user is able to utilize a client device 102 to submit requests across at least one network 104 to a resource provider environment 106. The client device can include any appropriate electronic device operable to send and receive requests, messages, or other such information over an appropriate network and convey information back to a user of the device. Examples of such client devices include personal computers, tablet computers, smart phones, notebook computers, and the like. The at least one network 104 can include any appropriate network, including an intranet, the Internet, a cellular network, a local area network (LAN), or any other such network or combination, and communication over the network can be enabled via wired and/or wireless connections. The resource provider environment 106 can include any appropriate components for receiving requests and returning information or performing actions in response to those requests. As an example, the provider environment might include Web servers and/or application servers for receiving and processing requests, then returning data, Web pages, video, audio, or other such content or information in response to the request.

In various embodiments, the provider environment may include various types of resources that can be utilized by multiple users for a variety of different purposes. In at least some embodiments, all or a portion of a given resource or set of resources might be allocated to a particular user or allocated for a particular task, for at least a determined period of time. The sharing of these multi-tenant resources from a provider environment (or multi-tenant environment) is often referred to as resource sharing, Web services, or "cloud computing," among other such terms and depending upon the specific environment and/or implementation. In this example the provider environment includes a plurality of resources 114 of one or more types. These types can include, for example, application servers operable to process instructions provided by a user or database servers operable to process data stored in one or more data stores 116 in response to a user request. As known for such purposes, the user can also reserve at least a portion of the data storage in a given data store. Methods for enabling a user to reserve various resources and resource instances are well known in the art, such that detailed description of the entire process, and explanation of all possible components, will not be discussed in detail herein.

In at least some embodiments, a user wanting to utilize a portion of the resources 114 can submit a request that is received to an interface layer 108 of the provider environment 106. The interface layer can include application programming interfaces (APIs) or other exposed interfaces enabling a user to submit requests to the provider environment. The interface layer 108 in this example can also include other components as well, such as at least one Web server, routing components, load balancers, and the like. When a request to provision a resource is received to the interface layer 108, information for the request can be directed to a resource manager 110 or other such system, service, or component configured to manage user accounts and information, resource provisioning and usage, and other such aspects. A resource manager 110 receiving the request can perform tasks such as to authenticate an identity of the user submitting the request, as well as to determine whether that user has an existing account with the resource provider, where the account data may be stored in at least one data store 112 in the provider environment. A user can provide any of various types of credentials in order to authenticate an identity of the user to the provider. These credentials can include, for example, a username and password pair, biometric data, a digital signature, or other such information. The provider can validate this information against information stored for the user. If the user has an account with the appropriate permissions, status, etc., the resource manager can determine whether there are adequate resources available to suit the user's request, and if so can provision the resources or otherwise grant access to the corresponding portion of those resources for use by the user for an amount specified by the request. This amount can include, for example, capacity to process a single request or perform a single task, a specified period of time, or a recurring/renewable period, among other such values. If the user does not have a valid account with the provider, the user account does not enable access to the type of resources specified in the request, or another such reason is preventing the user from obtaining access to such resources, a communication can be sent to the user to enable the user to create or modify an account, or change the resources specified in the request, among other such options.

Once the user is authenticated, the account verified, and the resources allocated, the user can utilize the allocated resource(s) for the specified capacity, amount of data transfer, period of time, or other such value. In at least some embodiments, a user might provide a session token or other such credentials with subsequent requests in order to enable those requests to be processed on that user session. The user can receive a resource identifier, specific address, or other such information that can enable the client device 102 to communicate with an allocated resource without having to communicate with the resource manager 110, at least until such time as a relevant aspect of the user account changes, the user is no longer granted access to the resource, or another such aspect changes.

The resource manager 110 (or another such system or service) in this example can also function as a virtual layer of hardware and software components that handles control functions in addition to management actions, as may include provisioning, scaling, replication, etc. The resource manager can utilize dedicated APIs in the interface layer 108, where each API can be provided to receive requests for at least one specific action to be performed with respect to the data environment, such as to provision, scale, clone, or hibernate an instance. Upon receiving a request to one of the APIs, a Web services portion of the interface layer can parse or otherwise analyze the request to determine the steps or actions needed to act on or process the call. For example, a Web service call might be received that includes a request to create a data repository.

An interface layer 108 in at least one embodiment includes a scalable set of customer-facing servers that can provide the various APIs and return the appropriate responses based on the API specifications. The interface layer also can include at least one API service layer that in one embodiment consists of stateless, replicated servers which process the externally-facing customer APIs. The interface layer can be responsible for Web service front end features such as authenticating customers based on credentials, authorizing the customer, throttling customer requests to the API servers, validating user input, and marshalling or unmarshalling requests and responses. The API layer also can be responsible for reading and writing database configuration data to/from the administration data store, in response to the API calls. In many embodiments, the Web services layer and/or API service layer will be the only externally visible component, or the only component that is visible to, and accessible by, customers of the control service. The servers of the Web services layer can be stateless and scaled horizontally as known in the art. API servers, as well as the persistent data store, can be spread across multiple data centers in a region, for example, such that the servers are resilient to single data center failures.

Figure 2:
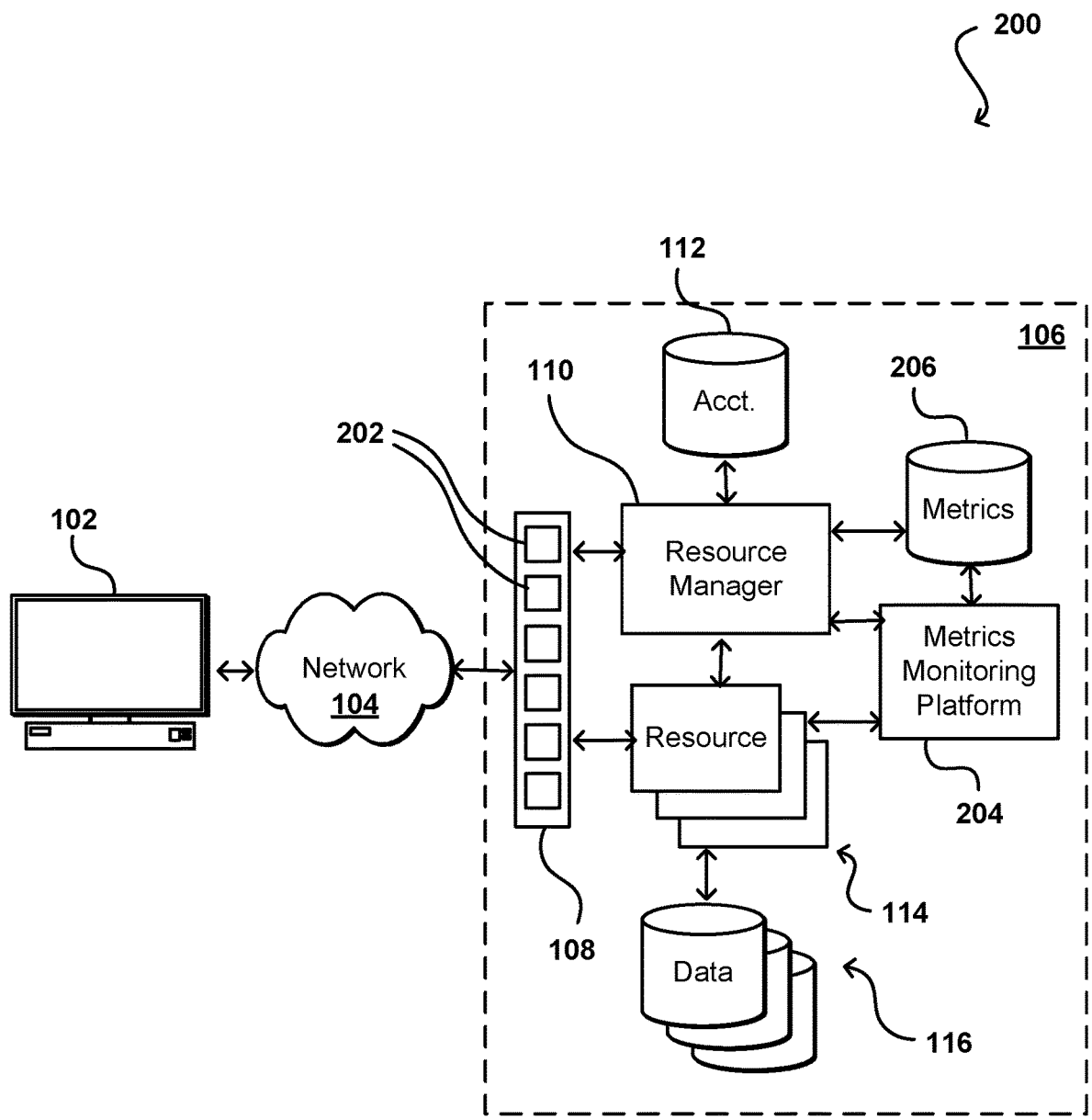
FIG. 2 illustrates an example environment wherein a metrics monitoring platform can monitor various metrics for processes performed in the environment that can be used in accordance with various embodiments.

FIG. 2 illustrates an example environment 200 wherein multiple APIs are contained within the interface layer 108. It should be understood that reference numbers for similar elements may be carried over between figures for simplicity of explanation but such usage should not be interpreted as a limitation on the various embodiments unless otherwise specifically stated. As mentioned, a customer of the resource environment 106 can use a client device 102 to submit requests, such as Web services requests, over the at least one network 104 that will be received and/or directed to the appropriate API 202. The API requests can be used to request the performance of certain tasks or retrieval of certain content or data, as well as to manage the resources, software, processes, and other aspects of the customer deployment within the resource provider environment. The management requests may be directed to a subset of APIs associated with a control plane, for example, that manages various aspects of the deployment through communication with a resource manager 110 or other such system, service, component, or device.

As an example, an API request can be received that requests that traffic to a particular group of resources be denied if the traffic meets certain parameters, such as from a certain geographic location, associated with a certain domain, lacking appropriate credentials or content, etc. In some instances such a change might cause an unexpected drop in accepted traffic, which may be undesirable to the customer. The customer in many cases must monitor the traffic over time and then attempt to correct the problem, which can result in a substantial amount of lost traffic in at least some situations.

Accordingly, approaches in accordance with various embodiments can enable the API request, or a related API or other Web services request, for the customer to specify one or more metrics or behaviors for the requested change. For example, an API request can specify that the volume of traffic per unit time must maintain above a specified level or threshold. If the volume of traffic falls below that threshold, the change should be rolled back or undone to a prior state of the resources (or software, configuration, etc.). An API request can also specify specific behaviors, such as that the deployment does not crash or experience unavailability, the output or performance of the deployment after the change is correct, etc. Behavior can be important to monitor as certain metrics might be satisfied but there might be other unexpected impact of the change. The metrics and/or behaviors in this example can be passed to a monitoring platform, such as a metrics monitoring platform 204, or other such system, service, component, or device, that can cause the metrics to be stored to an appropriate location, such as a metrics data store 206, and monitor the relevant metrics for the customer deployment for at least a determined monitoring period. The metrics monitoring platform 204 can include various servers, processors, dedicated software, and other such components useful for providing such functionality. The platform can communicate with the resource manager 110 and/or other such components to trigger a roll back if the values for the specified metrics fall outside an allowable range or value. This can include, for example, the platform 204 including logic for determining that the rollback should occur and requesting the rollback, or providing the metric data to the resource manager 110 whereby the resource manager can determine the appropriate action to take, among other such options.

In the example above where the traffic is denied if it meets certain parameters, the metric could involve a minimum number of pages served by Web servers associated with the customer deployment. The metrics monitoring platform 204 can monitor the number of pages served, or periodically request the number of pages served, etc., to determine whether the number of pages falls below the minimum number, volume, or frequency. If so, a roll back of the change can be triggered, whereby traffic meeting the specified parameters will again be permitted. In some embodiments there may be one or more rollback options. For example, if there are three parameters for which traffic is denied and the metric falls outside an allowable range, one or more of the parameter changes may be rolled back at a time in order to attempt to bring the metric back to within an acceptable range instead of undoing all the changes at once. In at least some embodiments the rollback can be triggered automatically. In other embodiments the metric data might be surfaced through an administration console or other such mechanism whereby a customer or other authorized entity can initiate the rollback in response to a notification that the metric has fallen outside the permissible range, among other such options.

The actions taken for a rollback or undo can vary among different implementations. For example, some systems may store state information and historical configuration data such that the system can be rolled back to a previous state. In other embodiments where such information is not available, the system may instead implement a different policy or rule, for example, which matches the previous policy. Thus, the system does not actually rollback to a previous policy but moves to a state with a policy that matches the old policy. Such an approach can potentially avoid undoing other changes that may have occurred since that previous state, among other potential differences. Certain other associated changes may need to be made as well, as may be managed by the resource manager 110 or another such system or service. This can include, for example, resetting connections, rebooting virtual machines, etc. Certain tasks may not be able to be undone, such as the deleting of data from the environment, such that alternative approaches can be implemented as discussed, such as to cause the data to be obtained from the customer and a new bucket created, etc. Customers can also be notified of changes that cannot be undone, as discussed elsewhere herein. Thus, in at least some embodiments the process is not an undo or revert process as much as a trigger to perform tasks to cause at least a portion of the state of the system to more to a state that matches or corresponds to a prior state.

In another example, there may be two parallel operations that utilize keys for access management or other such tasks. The keys can be enabled and disabled as appropriate, which can enable and disable the access for the operations. Various metrics can be specified such that upon the disabling of a key, that key can be re-enabled if the metric value falls outside a specified range. If the key was instead deleted, the process would need to have a way to obtain another copy of the key, such as from a customer or a key management service, among other such options. In some embodiments, a management console or other such component can also provide information about which types of tasks are unable to be undone or rolled back. For example, a customer might submit one or more metrics with a requested change. If at least some of that change is unable to be undone or rolled back in the event that the values of those metrics fall outside the specified range(s), a notification can be generated for the customer that the customer has to confirm before the change is enacted. This gives the customer the option of performing a different change, or at least being aware that the change cannot be undone in the event of an unintended or unexpected impact. In some embodiments a customer can have the option of rolling changes backwards and forward based upon the values of various metrics monitored for the customer deployment.

In many instances, a customer is making changes to the deployment in order to improve performance, whether it relates to security, latency, cost, accuracy, availability, and/or another such aspect. The ability to monitor various metrics to ensure that the change does not actually decrease performance, or at least reaches its intended improvement, can provide significant value to customers. Customer deployments can be quite complex, particularly for enterprise users and other such entities, such that it can be difficult to foresee all potential impacts of a change. The ability to monitor and rollback any change can prevent the customer from inadvertently degrading the performance of at least some aspects of the deployment. For example, a customer maybe willing to accept a regression in dimension that the customer attempted to improve in order to restore availability. The customer can specify the metric, set of metrics, or function expressed over a set of metrics to be monitored for the purpose of determine whether to roll forward or backward with an associated change or set of changes to a customer deployment. The customer can also specify other aspects of the monitoring as well, such as a length of time to monitor each specified metric. In some embodiments a customer can also enact a change without committing the change in order to monitor the effect of the change on the specified metric(s), and if the effect is within the expected range over a period of time then the change can be committed.

In some embodiments a user can specify metrics with at least some level of complexity, such as a range of values for a metric with a maximum threshold and a minimum threshold. For example, a customer might want to ensure that a minimum number of pages of content are served, but might also want to ensure that the number of pages served does not exceed a maximum amount such that the customer will receive an unexpectedly high bill for the resources needed to serve that amount of pages. There also can be combinations of metrics or functions of metrics such that even if any of the individual metrics are within range, if those metrics in aggregate fall outside a given range the change can still be rolled back. In some embodiments, the change is triggered through a series of API calls, and the steps required to undo the change can also require a series of related API calls.

In some embodiments, the monitoring may stop after a period of time where the metrics all remain within the permissible ranges. In other embodiments, at least some of the monitoring can continue over time. In at least some embodiments, the monitoring may continue during and after a rollback operation is performed. In some embodiments the rollback may not take the deployment back to a prior state where the metrics were within the desired range, and in some cases might actually make things worse. In such a situation, one or more remedial actions might be specified. These can include, for example, starting the system over with a default configuration or state, request human review and intervention, etc. In at least some embodiments a rollback operation includes determining a sequence of operations to be performed to restore the customer deployment to a state that existed before the change was implemented. This can be an inverse of the operations used to implement the change, or a set of operations necessary to undo the change without negatively impacting operations that may have occurred since the change, such as updates of various data, etc. In some embodiments a customer can provide the sequence of operations, or can at least provide a type of rollback to be performed. This can include, for example, a rollback to attempt to undo the change while retaining any other changes or data modifications since the change, while a major rollback might attempt to bring the deployment back to precisely the state before the change, which in some instances might mean a loss of data or updates, etc. In some embodiments information for the operations performed since the change can be retained at least until the change is determined to be successful, such that if a major rollback is performed then the updates can be performed on the rollback state to attempt to bring the deployment to be as current as possible and with a minimal loss of data, updates, or configuration changes.

In some embodiments, a metric monitoring platform or other such system or service might provide a set of metrics and associated values that can be monitored, and a customer or other authorized entity can select from among those metrics. In other embodiments a customer might be able to specify any metric capable of being monitored within the environment. In at least some embodiments, metric monitoring may not be allowable on a frequency higher than the frequency of the metric to be monitored. For example, if an order graph is updated once every five minutes then a frequency of two minutes may not be allowed as no change will be reported to occur after only two minutes in such an example. In some embodiments the monitoring frequency must be at least two monitoring frequency periods or more.

Various the effects of various other types of changes can be monitored as well within the scope of the various embodiments. For example, the size of a data table might be increased or the number of allowable IOPS adjusted, or the number of virtual machines or allocated resources updated, which can result in a drastic increase or decrease in resource usage, among other such unintended consequences. Other changes can include changes to network routing, security roles or groups, network access control lists, and the like. The effects of other changes such as changes in rules or policies can be monitored as well and potentially rolled back as discussed and suggested herein.

Various other approaches to enabling a rollback can be utilized in accordance with various embodiments. As mentioned, state information can be stored along with prior configuration settings and other such information to attempt to return to a prior state. In some embodiments virtual machines to be terminated or resources to be allocated to other tasks can remain available and configured until at least such time as the change is determined to provide acceptable results. In some embodiments, a snapshot or point-in-time view of the environment can be generated and archived or otherwise stored for subsequent retrieval. Some systems might utilize versioning and the system can revert to an earlier version in response to the metrics falling out of range. In some instances changes may not be able to be made directly, so there might be a policy document or other such mechanism that indicates tasks to be performed in order to bring the system to the desired state.

Figure 3:
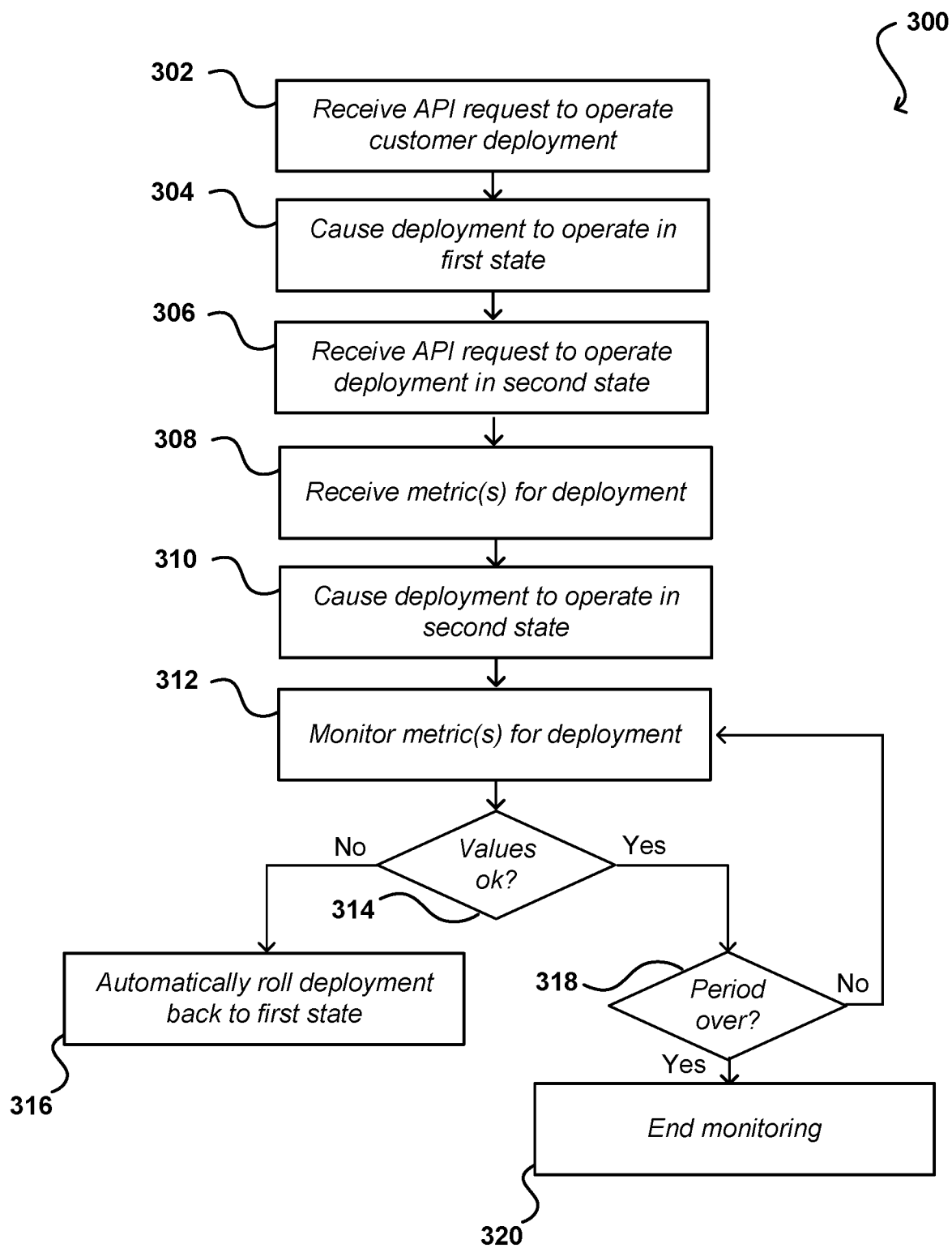
FIG. 3 illustrates an example process for monitoring metrics for a change to a customer deployment that can be utilized in accordance with various embodiments.

FIG. 3 illustrates an example process 300 for monitoring the effects of changes to a customer deployment (or other such utilization of resources) that can be utilized in accordance with various embodiments. It should be understood for this and other processes discussed herein that there can be additional, alternative, or fewer steps performed in similar or alternative orders, or in parallel, within the scope of the various embodiments unless otherwise stated. In this example, an API request is received 302 to operate a customer deployment in a resource provider environment. As discussed, this can involve provisioning and/or allocating resources of a multi-tenant environment to the processing and/or performing of tasks on behalf of the customer in at least some embodiments. The customer generally would have an account with a provider of the resources, and would be charged for the usage of those resources on behalf of the customer. In response to the request, assuming the appropriate account, authorization, validation, and/or other such information has been verified, the deployment can be caused 304 to operate in a first state in the resource provider environment. The first state can involve various factors or aspects, such as an amount of capacity, a type of resource used, a type of software used, a configuration applied, etc. Assuming the performance is acceptable in at least some embodiments, the deployment can operate in the first state for a period of time. At some point in time, another API request can be received 306, to the same or a different API of the resource provider environment, to operate the deployment in a second state. This request can include a change to one or more aspects of the deployment as discussed and suggested herein. Along with the request, one or more metrics can be received 308, or otherwise determined or obtained, for the customer deployment. These can be received as part of the same API request, a separate API request, or otherwise provided. Assuming the changes satisfy any rules or policies for the deployment, or other such factors are met, the deployment can be caused 310 to operate in the second state with the requested change(s).

For at least a specified or determined time after the change, the metric(s) for the deployment can be monitored 312. As mentioned, this can be performed by a metric monitoring platform or other such system that can determine the appropriate metrics and the corresponding values over a period of time. The monitoring platform can either analyze these values to determine whether the values are within the acceptable ranges or provide the values to another component or system for such analysis. A determination can be made 314 as to whether or not the current values are acceptable, such as above (or below) a determined threshold or within a specified range. If not, the deployment can automatically be rolled back 316 to operating in the first state. As mentioned, this can be performed in any of a number of different ways, such as by performing an undo operation, using a snapshot to restore prior configuration values, reverting to a previous version, etc. If the values for the metrics remain acceptable, a determination can be made 318 as to whether the monitoring period is over, or another such end criterion is reached. If not, the monitoring can continue. If so, the monitoring of the metrics can end 320 and the deployment allowed to continue to operate in the second state.

Figure 4:
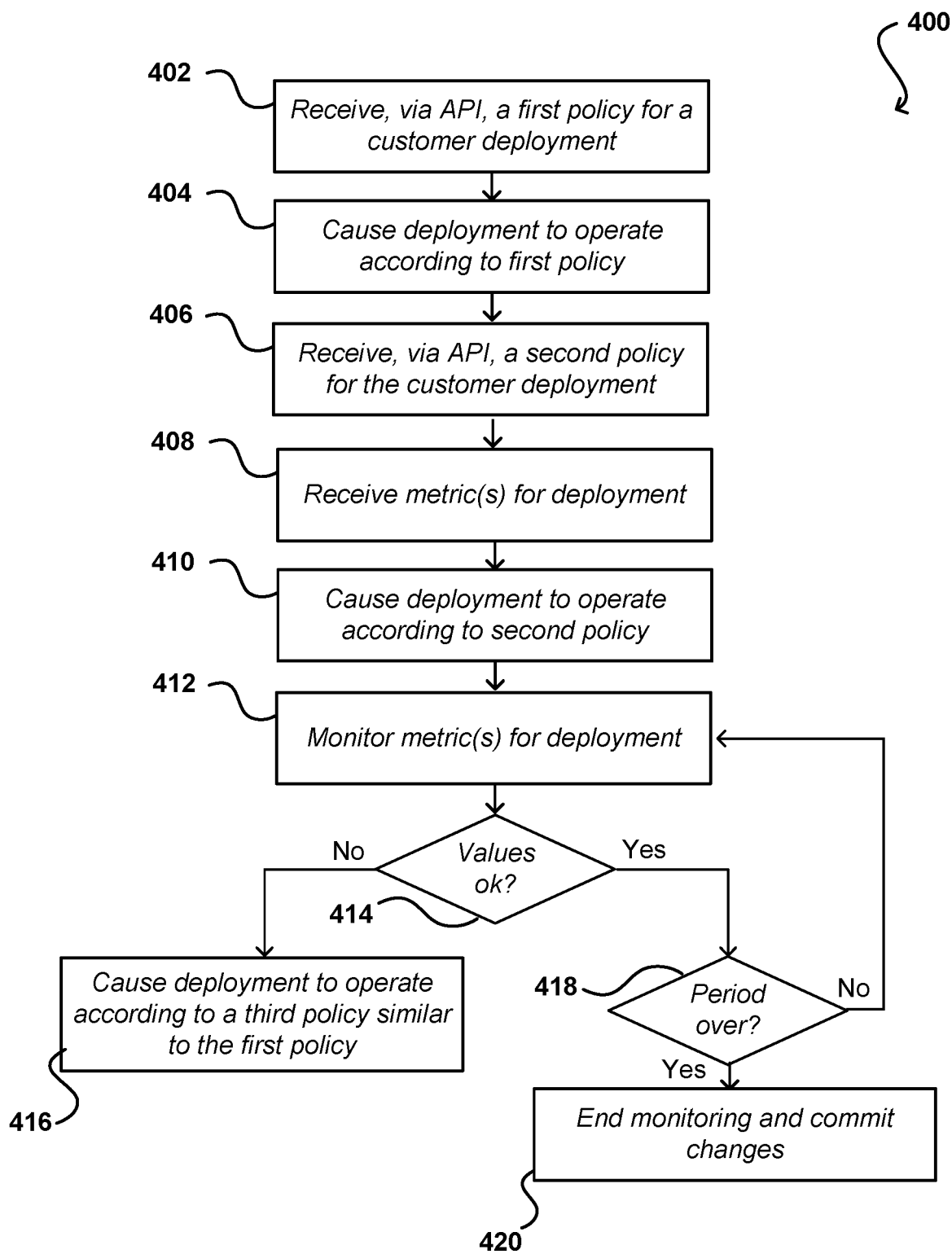
FIG. 4 illustrates another example process for monitoring metrics for a change to a customer deployment that can be utilized in accordance with various embodiments.

FIG. 4 illustrates another example process 400 for monitoring a change in deployment that can be utilized in accordance with various embodiments. In this example, a first policy for a customer deployment is received 402 through an appropriate API of a resource environment. As mentioned, the policy can relate to one or more aspects of the deployment, and there may be multiple policies used to govern the deployment at any time. Assuming the policy complies with any rules or policies of the environment, or other such criteria, the deployment can be caused 404 to operate according to the first policy. Subsequently, a second policy can be received 406, via the same or a different API, to cause the deployment to operate according to a second policy. The second policy can involve at least one operational or functional change for at least one aspect of the deployment. One or more metrics for the deployment can also be received 408, either with or separately from the second policy. Further, in some embodiments one or more metrics or other criteria can be provided that are to be monitored for any change to the deployment. Assuming the second policy satisfies the aforementioned criteria, the deployment can be caused 410 to operate according to the second policy. As mentioned, in some embodiments the system can operate in an intermediate state, or other such state, wherein the change is made to at least a portion of the environment and the metrics monitored for a period of time to ensure that the change does not negatively impact the deployment before committing or otherwise applying the change to the remained of the deployment and/or deleting or reconfiguring resources that would otherwise be used to undo the change to the deployment.

During at least the specified period, the metric(s) can be monitored 412 as discussed elsewhere herein. If the values are determined 414 to be acceptable, and it is determined 418 that the monitoring period is not over, the monitoring can continue. If the values are not acceptable, such as where the value of one or more metrics falls above or below a specified threshold, or falls outside a specified range, the deployment can be caused 416 to operate according to a third policy, which can be similar to the first policy. The third policy can be the same as the first policy, or can include changes that cause the deployment to operate as the deployment operated under the first policy, among other such options. If the values for the metrics are acceptable for at least the monitoring period, the monitoring end 420 and any remaining changes for the second policy committed. This can include, for example, applying the changes to the remainder of the deployment, committing the changes, deleting leftover files or resources from the prior state, etc.

Figure 5:
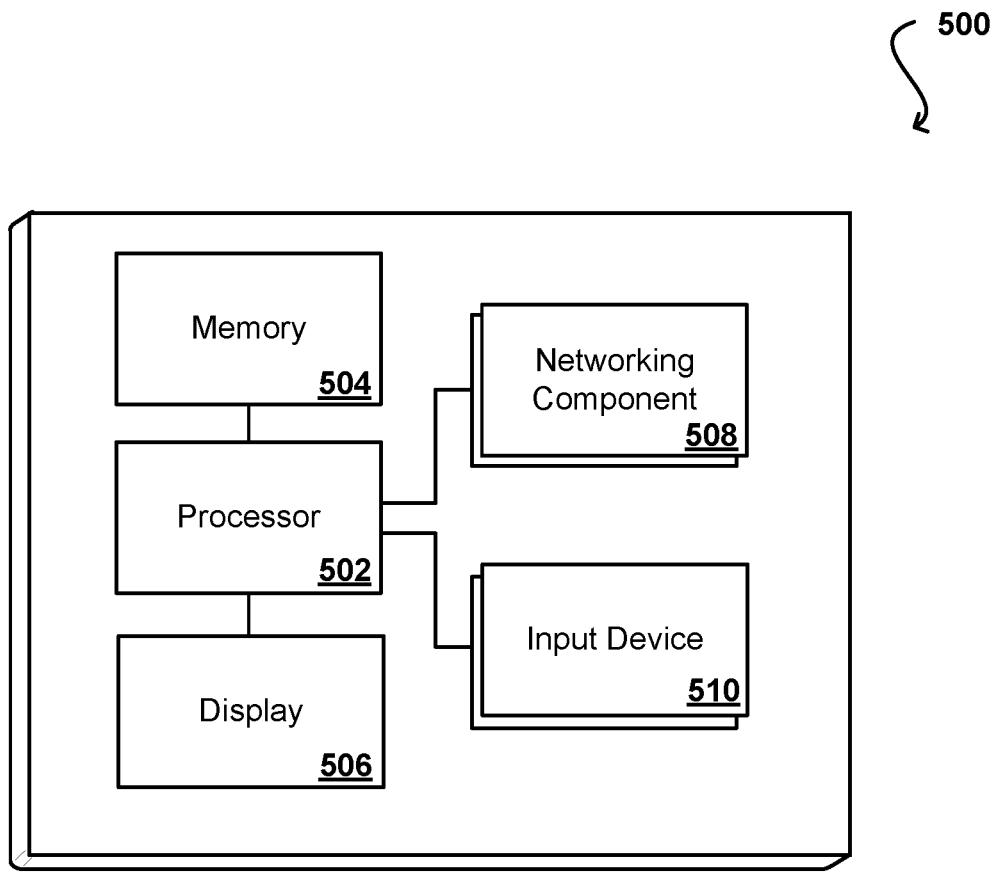
FIG. 5 illustrates example components of a computing device that can be used to implement aspects of various embodiments.

FIG. 5 illustrates a set of basic components of an example computing device 500 that can be utilized to implement aspects of the various embodiments. In this example, the device includes at least one processor 502 for executing instructions that can be stored in a memory device or element 504. As would be apparent to one of ordinary skill in the art, the device can include many types of memory, data storage or computer-readable media, such as a first data storage for program instructions for execution by the at least one processor 502, the same or separate storage can be used for images or data, a removable memory can be available for sharing information with other devices, and any number of communication approaches can be available for sharing with other devices. The device may include at least one type of display element 506, such as a touch screen, electronic ink (e-ink), organic light emitting diode (OLED) or liquid crystal display (LCD), although devices such as servers might convey information via other means, such as through a system of lights and data transmissions. The device typically will include one or more networking components 508, such as a port, network interface card, or wireless transceiver that enables communication over at least one network. The device can include at least one input device 510 able to receive conventional input from a user. This conventional input can include, for example, a push button, touch pad, touch screen, wheel, joystick, keyboard, mouse, trackball, keypad or any other such device or element whereby a user can input a command to the device. These I/O devices could even be connected by a wireless infrared or Bluetooth or other link as well in some embodiments. In some embodiments, however, such a device might not include any buttons at all and might be controlled only through a combination of visual and audio commands such that a user can control the device without having to be in contact with the device.

As discussed, different approaches can be implemented in various environments in accordance with the described embodiments. As will be appreciated, although a Web-based environment is used for purposes of explanation in several examples presented herein, different environments may be used, as appropriate, to implement various embodiments. The system includes an electronic client device, which can include any appropriate device operable to send and receive requests, messages or information over an appropriate network and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server for receiving requests and serving content in response thereto, although for other networks, an alternative device serving a similar purpose could be used, as would be apparent to one of ordinary skill in the art.

The illustrative environment includes at least one application server and a data store. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server in the form of HTML, XML or another appropriate structured language in this example. The handling of all requests and responses, as well as the delivery of content between the client device and the application server, can be handled by the Web server. It should be understood that the Web and application servers are not required and are merely example components, as structured code discussed herein can be executed on any appropriate device or host machine as discussed elsewhere herein.

The data store can include several separate data tables, databases or other data storage mechanisms and media for storing data relating to a particular aspect. For example, the data store illustrated includes mechanisms for storing content (e.g., production data) and user information, which can be used to serve content for the production side. The data store is also shown to include a mechanism for storing log or session data. It should be understood that there can be many other aspects that may need to be stored in the data store, such as page image information and access rights information, which can be stored in any of the above listed mechanisms as appropriate or in additional mechanisms in the data store. The data store is operable, through logic associated therewith, to receive instructions from the application server and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated. Thus, the depiction of the systems herein should be taken as being illustrative in nature and not limiting to the scope of the disclosure.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, FTP, UPnP, NFS, and CIFS. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM® as well as open-source servers such as MySQL, Postgres, SQLite, MongoDB, and any other server capable of storing, retrieving and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and other non-transitory computer readable media for containing code, or portions of code, can include any appropriate media known or used in the art, such as but not limited to volatile and non-volatile, removable and non-removable media implemented in any method or technology for storage of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A non-transitory computer readable storage medium storing instructions executable by one or more processors to:
   initiate a first portion of a deployment using a plurality of electronic resources in a multi-tenant environment according to a first policy;
   allocate resources for a second portion of the deployment and operate the second portion of the deployment according to a second policy;
   monitor, for at least a specified period of time after applying the second policy, current values of at least one metric associated with the second portion of the deployment;
   operate the entire deployment, including the first portion previously operating according to the first policy, according to the second policy, in response to a determination that the at least one metric is within an acceptable range for at least the specified period of time when operating the second portion of the deployment according to the second policy; and
   operate the entire deployment, including the second portion previously operating according to the second policy, according to a third policy, in response to a determination that the at least one metric is outside the acceptable range for at least the specified period of time when operating the second portion of the deployment according to the second policy.

2. The non-transitory computer readable storage medium of claim 1, wherein at least some data modifications made when operating the deployment according to the second policy are retained after causing operation of the entire deployment according to the third policy.

3. The non-transitory computer readable storage medium of claim 1, wherein the instructions are further executable by one or more processors to:
   receive a request via an application programming interface (API) associated with the plurality of electronic resources, the request being a Web services request, to operate the second portion of the deployment according to the second policy.

4. The non-transitory computer readable storage medium of claim 1, wherein operating the entire deployment according to the third policy comprises adjusting parameters of the deployment to values determined using a snapshot captured before operating the second portion of the deployment according to the second policy.

5. The non-transitory computer readable storage medium of claim 1, wherein the instructions are further executable by one or more processors to:
   determine, before operating the second portion of the deployment according to the second policy, that an action of operating the deployment according to the second policy is unable to be undone; and
   provide a new request via an API that specifies an alternative action or set of actions for the second policy, wherein the alternative action or set of actions does not include the action that is unable to be undone.

6. The non-transitory computer readable storage medium of claim 1, wherein the instructions are further executable by one or more processors to:
   operate the entire deployment, including the first portion previously operating according to the first policy and the second portion previously operating according to the second policy, according to the third policy, in response to a determination that reallocating the second portion according to the first policy is unavailable.

7. The non-transitory computer readable storage medium of claim 6, wherein the third policy is similar to the first policy.

8. The non-transitory computer readable storage medium of claim 1, wherein the at least one metric is associated with at least one of security, latency, accuracy, or availability.

9. A non-transitory computer readable storage medium storing instructions executable by one or more processors to:
   initiate a first portion of a deployment according to a new revision;
   monitor at least one metric associated with the first portion of the deployment for a period of time;
   reallocate the entire deployment, including a second portion of the deployment previously operable under a current revision, to operate according to the new revision, in response to a determination that the at least one metric is within an acceptable range for the period of time; and reallocate the entire deployment, including the first portion of the deployment, to operate according to an updated revision, in response to a determination that the at least one metric is outside the acceptable range for the period of time.

10. The non-transitory computer readable storage medium of claim 9, wherein the instructions are further executable by one or more processors to:
determine a sequence of operations needed to return the first portion of the deployment to the current revision before operating the first portion of the deployment according to the new revision; and
apply the sequence of operations to reallocate the entire deployment according to the current revision.

11. The non-transitory computer readable storage medium of claim 9, wherein the instructions are further executable by one or more processors to:
maintain at least some data modifications made when operating the first portion of the deployment according to the new revision after causing operation of the entire deployment according to the updated revision.

12. The non-transitory computer readable storage medium of claim 9, wherein the instructions are further executable by one or more processors to:
allocate resources for the first portion of the deployment responsive to a request.

13. The non-transitory computer readable storage medium of claim 9, wherein the acceptable range comprises at least one of a maximum threshold or a minimum threshold.

14. The non-transitory computer readable storage medium of claim 9, wherein the instructions are further executable by one or more processors to:
operate the entire deployment, including the first portion previously operating according to the new revision and the second portion previously operating according to the current revision, according to the updated revision in response to a determination that reallocating the first portion according to the current revision is unavailable.

15. The non-transitory computer readable storage medium of claim 14, wherein the updated revision is similar to the current revision.

16. A system, comprising:
at least one processor; and
memory including instructions that, when executed by the at least one processor, cause the storage device to:
initiate a first portion of a deployment according to a new revision;
monitor at least one metric associated with the first portion of the deployment for a period of time;
reallocate the entire deployment, including a second portion of the deployment previously operable under a current revision, to operate according to the new revision, in response to a determination that the at least one metric is within an acceptable range for the period of time; and
reallocate the entire deployment, including the first portion of the deployment, to operate according to an updated revision, in response to a determination that the at least one metric is outside the acceptable range for the period of time.

17. The system of claim 16, wherein the instructions when executed further cause the system to:
determine a sequence of operations needed to return the first portion of the deployment to the current revision before operating the first portion of the deployment according to the new revision; and
apply the sequence of operations to reallocate the entire deployment according to the current revision.

18. The system of claim 16, wherein the instructions when executed further cause the system to:
maintain at least some data modifications made when operating the first portion of the deployment according to the new revision after causing operation of the entire deployment according to the updated revision.

19. The system of claim 16, wherein the instructions when executed further cause the system to:
allocate resources for the first portion of the deployment responsive to a request.

20. The system of claim 16, wherein the acceptable range comprises at least one of a maximum threshold or a minimum threshold.

* * * * *